HOEPFNER & SCHNEPF.
Beer Cooler.
No. 40,262.
Patented Oct. 13, 1863.
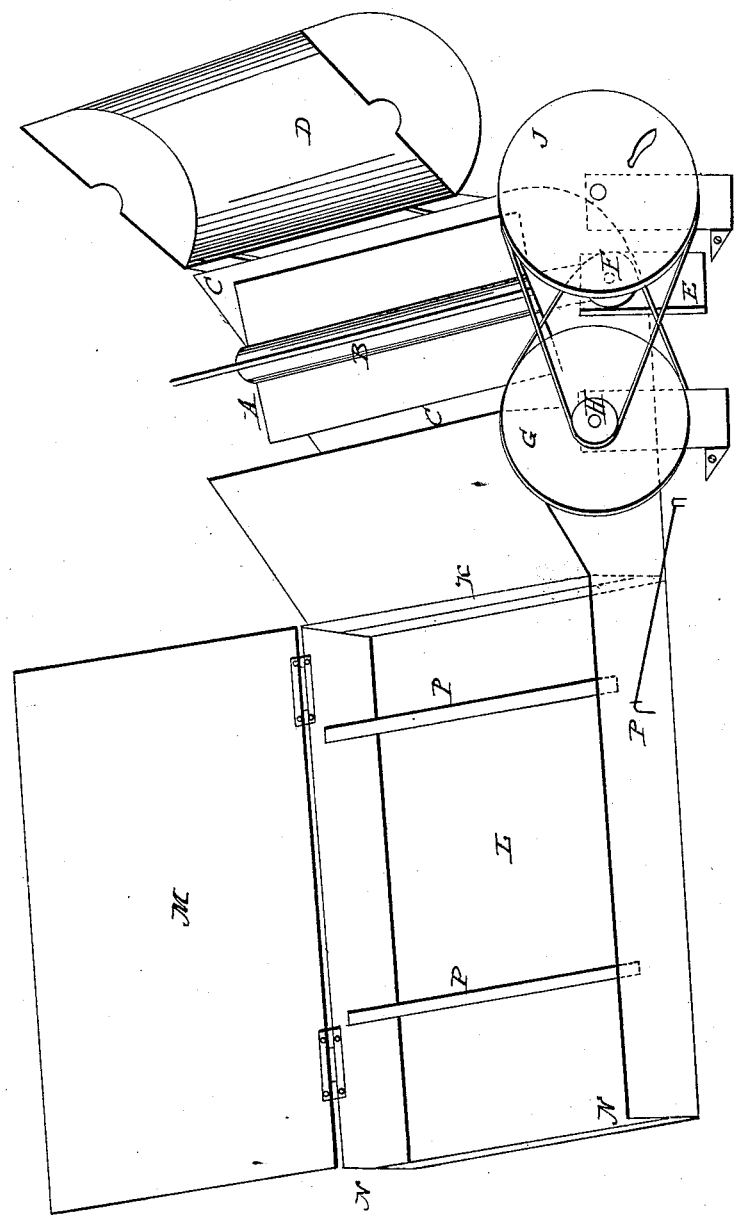

UNITED STATES PATENT OFFICE.

OTTO HOEPFNER AND CHARLES SCHNEPF, OF PHILADELPHIA, PENNSYLVANIA.

IMPROVED APPARATUS FOR COOLING MALT LIQUORS.

Specification forming part of Letters Patent No. 40,262, dated October 13, 1863.

*To all whom it may concern:*

Be it known that we, OTTO HOEPFNER and CHARLES SCHNEPF, both of the city of Philadelphia, and State of Pennsylvania, have invented a new and useful Machine for Cooling Malt Liquors; and we do hereby declare that the following is a full and exact description thereof, reference being had to the accompanying drawings, and to the letters of reference marked thereon, making a part of this specification.

The nature of our invention consists in the arrangement and combination of an inclosed fan with a covered cooler, for the purpose of cooling malt liquors.

To enable others skilled in the art to make and use our invention, we will proceed to describe its construction and operation, as follows:

A represents the horizontal fan, made of four wings attached to a center shaft, B, and inclosed in a circular-shaped box, C, with a lid, D. The one end of shaft B operates on a post, E, and has a small band-pulley or pinion-wheel, F, which is geared to a large band-wheel, G, having a center band-wheel, H, which is geared by a band to a main driving-wheel, J, operated by a crank, or intended to be driven by horse or steam power.

The front part of box C is tapered, and has a long aperture, K, extending across it, through which the wind or blast from the fan passes into the cooler L. The cooler L is oblong or square shaped of any required size in length or width, and about eight inches in depth, and has a lid or cover, M, to keep the liquor clean, free from dust, flies, &c., that commonly settle in the open room on the liquor.

The present mode of cooling the malt liquors is to run them from the brewing-kettles into a large open apartment, to be cooled by the surrounding atmosphere before they are discharged into the fermenting-tubs; hence malt liquors are only made in the winter season, that they can be more easily and quickly cooled.

To facilitate the manufacture of beer or malt liquors in the summer as well as winter, we make this square cooler L of any required size, with a long aperture, K, at one end to correspond with the aperture K of the blower, and a corresponding aperture, N, at the opposite side, so that when the cooler is filled with the liquor, the air or blast from the fan A passes between the lid M and the top of the liquor, blowing off the steam and evaporation out through the aperture N, and effectually cooling the liquor, saving much time and trouble, and making the liquor clearer and purer at any season of the year.

Stays P are cross-strips to brace the sides of the cooler L, and hooks and eyes R aid in holding the blower or fan firmly to the cooler.

What we claim as our invention, and desire to secure by Letters Patent, is—

The arrangement and combination of an inclosed fan with a covered cooler, arranged and combined as herein described, and for the purposes set forth.

OTTO HOEPFNER.
CHARLES SCHNEPF.

Witnesses:
JOHN S. HOLLINGSHEAD,
J. FRANKLIN REIGART.